US010030405B2

(12) United States Patent
Abe et al.

(10) Patent No.: US 10,030,405 B2
(45) Date of Patent: Jul. 24, 2018

(54) PUSHING-OUT APPARATUS FOR EXTENDIBLE MAST

(71) Applicant: NIPPI Corporation, Yokohama-shi, Kanagawa-ken (JP)

(72) Inventors: Kazuhiro Abe, Yokohama (JP); Jun Kurihara, Yokohama (JP)

(73) Assignee: NIPPI CORPORATION, Yokohama-shi (JP)

( * ) Notice: Subject to any disclaimer, the term of this patent is extended or adjusted under 35 U.S.C. 154(b) by 0 days.

(21) Appl. No.: 15/386,457

(22) Filed: Dec. 21, 2016

(65) Prior Publication Data
US 2017/0183888 A1    Jun. 29, 2017

(30) Foreign Application Priority Data

Dec. 25, 2015    (JP) ................. 2015-254525

(51) Int. Cl.
*E04H 12/34*    (2006.01)
*E04H 12/18*    (2006.01)
*E04H 12/10*    (2006.01)

(52) U.S. Cl.
CPC ............. *E04H 12/34* (2013.01); *E04H 12/10* (2013.01); *E04H 12/182* (2013.01)

(58) Field of Classification Search
CPC ........ E04H 12/10; E04H 12/34; E04H 12/182
(Continued)

(56) References Cited

U.S. PATENT DOCUMENTS 2,795,303 A * 6/1957 Muehlhause ......... E04H 12/182
52/121
3,688,455 A * 9/1972 Zebuhr ................. E04H 12/182
343/883

(Continued)

FOREIGN PATENT DOCUMENTS

GB    2 104 610 A    3/1983
JP    S62-122900    6/1987

(Continued)

OTHER PUBLICATIONS

Extended European Search Report and European Search Opinion dated Jun. 8, 2017 in connection with related European Application No. EP 16 20 5505.

(Continued)

*Primary Examiner* — Charles A Fox
*Assistant Examiner* — James Buckle, Jr.
(74) *Attorney, Agent, or Firm* — John P. White; Cooper & Dunham LLP

(57) ABSTRACT

A pushing-out apparatus for an extendible mast includes a mast storing unit, a mast pushing-out unit and a mast pushing-out driving unit. The storing unit stores an extendible mast including stages of foldable trusses in a state that the stages are folded. The pushing-out unit is stored in the storing unit around the stage-folded mast stored in the storing unit. The driving unit moves the pushing-out unit to a projecting position in an outside of the storing unit while the stages of the mast are folded, sequentially extend out the folded stages of the mast stored in the storing unit by the pushing-out unit from the storing unit and push out the extended stages from the pushing-out unit of the projecting position in a side of the pushing-out unit opposing to the storing unit.

6 Claims, 7 Drawing Sheets

(58) Field of Classification Search
USPC .......................................................... 52/111
See application file for complete search history.

(56) References Cited

U.S. PATENT DOCUMENTS

| | | | | |
|---|---|---|---|---|
| 4,115,975 A * | 9/1978 | Bliss | ...................... | A47C 4/286 |
| | | | | 248/166 |
| 4,151,534 A * | 4/1979 | Bond | ................... | H01Q 1/1235 |
| | | | | 343/883 |
| 4,357,785 A * | 11/1982 | Eklund | ................ | E04H 12/182 |
| | | | | 212/350 |
| 4,480,415 A * | 11/1984 | Truss | ...................... | B64G 9/00 |
| | | | | 244/159.5 |
| 4,557,097 A * | 12/1985 | Mikulas, Jr. | .......... | E04H 12/185 |
| | | | | 16/242 |
| 4,569,176 A * | 2/1986 | Hedgepeth | ............... | B64G 9/00 |
| | | | | 182/152 |
| 4,578,919 A * | 4/1986 | Amadon | ................. | B64G 9/00 |
| | | | | 52/108 |
| 4,604,844 A * | 8/1986 | Mikulas, Jr. | ............. | B64G 9/00 |
| | | | | 52/111 |
| 4,637,192 A * | 1/1987 | Brown | .................... | E04H 12/18 |
| | | | | 428/12 |
| 4,655,022 A * | 4/1987 | Natori | ...................... | B64G 9/00 |
| | | | | 52/108 |
| 4,667,451 A * | 5/1987 | Onoda | ...................... | E04B 1/19 |
| | | | | 52/111 |
| 4,771,585 A * | 9/1988 | Onoda | .................... | B64G 9/00 |
| | | | | 52/111 |
| 4,785,309 A * | 11/1988 | Gremillion | .......... | H01Q 1/1235 |
| | | | | 343/883 |
| 4,866,892 A * | 9/1989 | Satoh | .................... | E04H 12/185 |
| | | | | 52/108 |
| 5,035,094 A * | 7/1991 | Legare | ................ | B63B 15/0083 |
| | | | | 343/903 |
| 5,085,018 A * | 2/1992 | Kitamura | ................. | B64G 9/00 |
| | | | | 52/108 |
| 5,101,215 A * | 3/1992 | Creaser, Jr. | ........... | E04H 12/182 |
| | | | | 343/883 |
| 5,154,027 A * | 10/1992 | Warden | .................... | B64G 9/00 |
| | | | | 343/880 |
| 5,163,262 A * | 11/1992 | Adams | ..................... | B64G 9/00 |
| | | | | 52/111 |
| 5,184,444 A * | 2/1993 | Warden | .................... | B64G 9/00 |
| | | | | 52/108 |
| 5,557,892 A * | 9/1996 | Lavin | .................... | E04H 12/182 |
| | | | | 343/883 |
| 5,572,837 A * | 11/1996 | Featherstone | ............. | B60P 3/18 |
| | | | | 362/385 |
| 5,615,855 A * | 4/1997 | Marue | ....................... | B60P 3/18 |
| | | | | 248/188.5 |
| 7,574,832 B1 * | 8/2009 | Lieberman | .............. | E04H 12/10 |
| | | | | 212/350 |
| 7,966,777 B2 * | 6/2011 | Douglas | ................ | E04H 12/182 |
| | | | | 52/110 |
| 9,249,565 B2 * | 2/2016 | Merrifield | ............... | E04C 3/005 |
| 9,371,663 B2 * | 6/2016 | Pereira | ................... | E04H 12/182 |
| 2002/0040726 A1 * | 4/2002 | Roth | ...................... | B64G 1/222 |
| | | | | 136/244 |
| 2008/0283670 A1 * | 11/2008 | Harvey | .................. | B64G 1/222 |
| | | | | 244/172.6 |
| 2009/0145056 A1 * | 6/2009 | Pereira | ................... | E04H 12/00 |
| | | | | 52/111 |

FOREIGN PATENT DOCUMENTS

| | | |
|---|---|---|
| JP | H1-215697 | 8/1989 |
| JP | H5-92800 | 4/1993 |
| JP | H6-248828 | 9/1994 |
| JP | 2002-154499 | 5/2002 |

OTHER PUBLICATIONS

First Office Action dated Feb. 7, 2017 in connection with Japanese Patent Application No. JP 2015-254525.

* cited by examiner

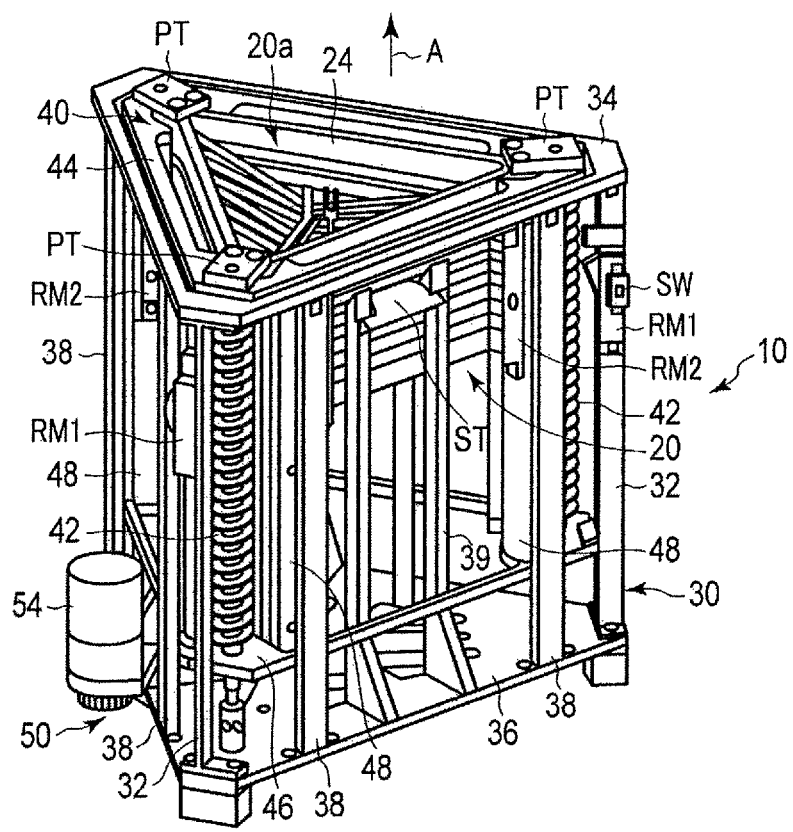
F I G. 1

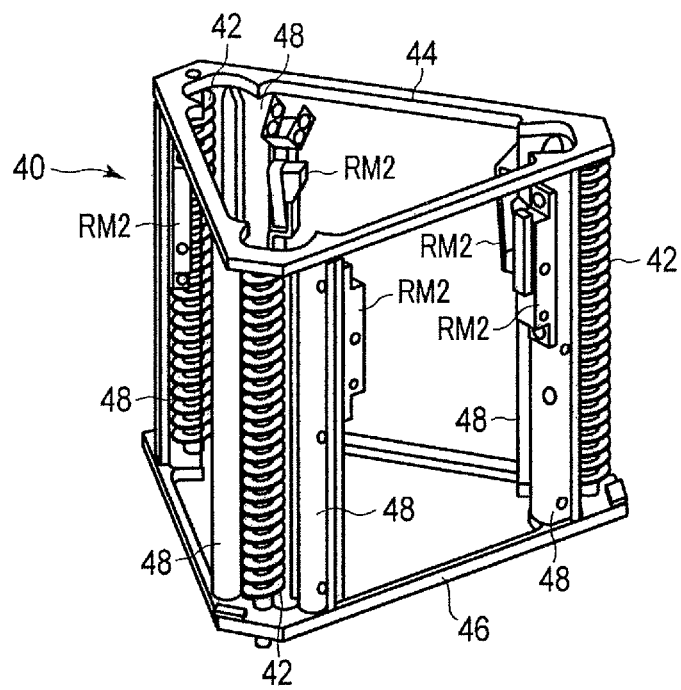 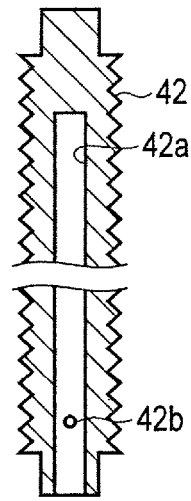
FIG. 3A    FIG. 3B
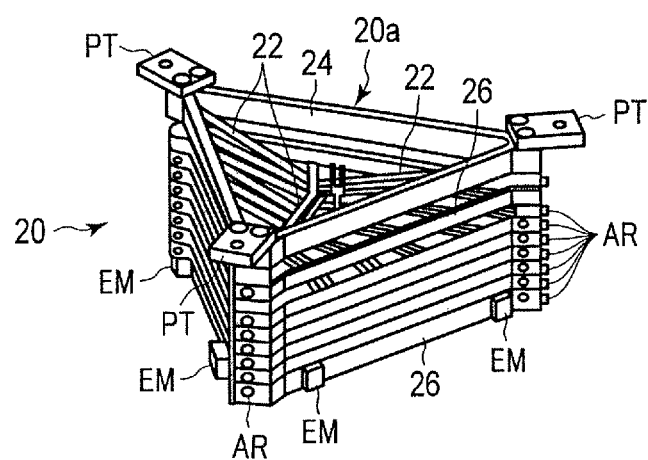
FIG. 4

PUSHING-OUT APPARATUS FOR EXTENDIBLE MAST

CROSS-REFERENCE TO RELATED APPLICATIONS

This application is based upon and claims the benefit of priority from Japanese Patent Application No. 2015-254525 filed Dec. 25, 2015, the entire contents of which are incorporated herein by reference.

FIELD OF THE INVENTION

This invention relates to an apparatus for pushing out an extendible mast.

BACKGROUND OF THE INVENTION

An extendible mast has already be known in a configuration of which plural stages of foldable trusses are continued. A conventional apparatus for pushing out such an extendible mast as described above comprises a mast storing unit and a mast pushing-out unit. The mast storing unit is configured to store the extendible mast which is in a state that the plural trusses of stages are folded. The mast pushing-out unit is adjoined and is fixed to the mast storing unit. And, the mast pushing-out unit is configured to extend out the extendible mast stored in the mast storing unit into a side of the mast pushing-out unit opposite to the mast storing unit if necessary by sequentially extending out the plural trusses of stages folded and stored in the mast storing unit and by pushing out the extended trusses of stages into the side of the mast pushing-out unit opposite to the mast storing unit.

Almost all of extendible masts are used while they are mounted on moving objects. Therefore, it is preferable that a pushing-out apparatus for an extendible mast to be mounted on the moving object is as small as possible. A space moving object such as an artificial satellite, a spaceship or a planet probe is included in the moving object, and a pushing-out apparatus for an extendible mast to be mounted on the space moving object is especially and strongly required to be miniaturized.

This invention is derived from the above described circumstances and an object of this invention is to provide a pushing-out apparatus for an extendible mast, which can be remarkably miniaturized as compared with the conventional one.

SUMMARY OF THE INVENTION

In order to achieve the above described object of this invention, a pushing-out apparatus for an extendible mast according to the present invention comprises a mast storing unit, a mast pushing-out unit and a mast pushing-out driving unit. According to the present invention, the mast storing unit is configured to store an extendible mast including plural stages of foldable trusses in a state that the plural stages are folded. According to the present invention, the mast pushing-out unit is configured to be stored in the mast storing unit around the extendible mast stored in the mast storing unit in the state that the plural stages are folded. Further, according to the present invention, the mast pushing-out driving unit is configured to move the mast pushing-out unit in a moving direction to a predetermined projecting position in an outside of the mast storing unit while the plural stages of the extendible mast are folded, to sequentially extend out the plural folded stages of the extendible mast stored in the mast storing unit by the mast pushing-out unit of the projecting position from the mast storing unit and to push out the extended stages from the mast pushing-out unit of the projecting position in a side of the mast pushing-out unit opposing to the mast storing unit.

In the pushing-out apparatus for an extendible mast according to the present invention and characterized by comprising the above described units, the mast storing unit stores the extendible mast including the plural stages of foldable trusses in the state that the plural stages are folded. And, the mast pushing-out unit is stored in the mast storing unit around the extendible mast stored in the mast storing unit in the state the plural stages are folded.

As a result of this, an outer dimension of the pushing-out apparatus for an extendible mast according to the present invention is substantially the same as an outer dimension of the mast storing unit while the plural stages of the extendible mast are stored in the mast storing unit in the state that the plural stages are folded, or until the extendible mast stored in the mast storing unit in the state that the plural stages are folded is pushed out by the mast pushing-out unit to an outside of the mast storing unit and is started to extend out the plural folded stages.

In the conventional pushing-out apparatus for an extendible mast as described above, the mast pushing-out unit is adjoined and fixed to the mast storing unit while the plural stages of the extendible mast are stored in the mast storing unit in the state that the plural stages are folded. Therefore, the outer dimension of the pushing-out apparatus for an extendible mast according to the present invention and comprising the mast storing unit and the mast pushing-out unit both configured as described above is surely and remarkably miniaturized by the outer dimension of the mast pushing-out unit in comparison to the outer dimension of the conventional pushing-out apparatus for an extendible mast as described above.

In the pushing-out apparatus for an extendible mast according to the present invention, the mast pushing-out driving unit which relates to the mast storing unit, the extendible mast in a state that the plural stages are folded and stored in the mast storing unit, and the mast pushing-out unit stored around the extendible mast in the state that the plural stages are folded in the mast storing unit, is arranged along the mast storing unit, the extendible mast in a state that the plural stages are folded and stored in the mast storing unit, and the mast pushing-out unit. Therefore, the mast pushing-out driving unit does not substantially spoil the above described remarkable miniaturization of the outer dimension of the pushing-out apparatus for an extendible mast according to the present invention.

BRIEF DESCRIPTION OF THE DRAWINGS

FIG. 1 is a perspective view schematically showing the whole of a pushing-out apparatus for an extendible mast according to one embodiment of the present invention in a state that the extendible mast and a mast pushing-out unit are stored in a mast storing unit while plural trusses of stages of the extendible mast are folded;

FIG. 3A is a perspective view schematically showing the mast pushing-out unit of the pushing-out apparatus for an extendible mast shown in FIG. 1, the mast pushing-out unit being provided with the other part of the mast pushing-out driving unit;

FIG. 3B is a schematic longitudinal sectional view of a lead screw included in the other part of the mast pushing-out driving unit of FIG. 3A;

FIG. 4 is a perspective view schematically showing the extendible mast in a state that the plural trusses of stages are folded, the extendible mast being to be stored in the mast storing unit of FIG. 2A in the pushing-out apparatus for an extendible mast shown in FIG. 1 in the state that the plural trusses of stages are folded and being to be extended out by the mast pushing-out unit of FIG. 3A;

DETAILED DESCRIPTION OF THE INVENTION

Figure 2A:
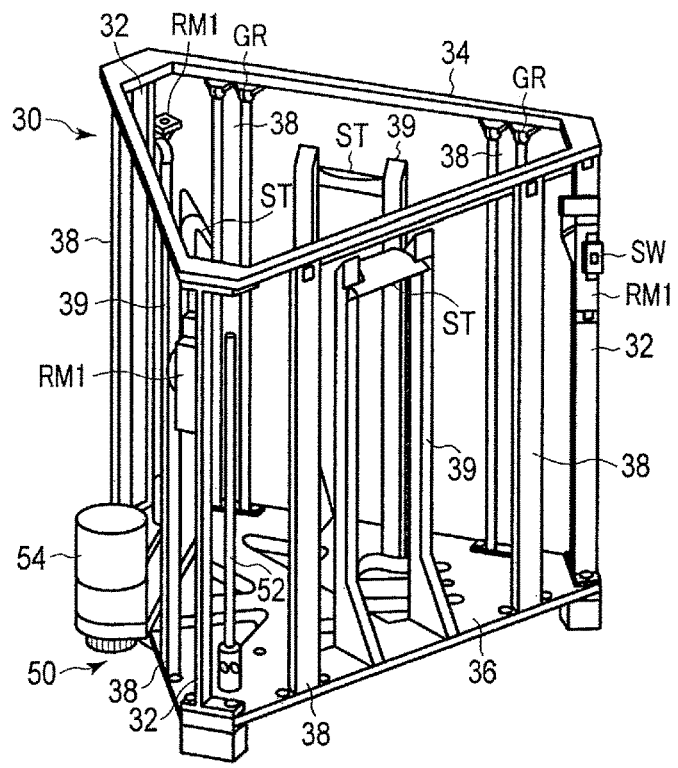
FIG. 2A is a perspective view schematically showing the mast storing unit of the pushing-out apparatus for an extendible mast shown in FIG. 1, the mast storing unit being provided with one part of a mast pushing-out driving unit.

Hereinafter, one embodiment of the present invention will be described with reference to FIGS. 1 to 7 of the accompanying drawings.

In FIG. 1, the whole of a pushing-out apparatus 10 for an extendible mast according to one embodiment of the present invention is shown.

The pushing-out apparatus 10 for an extendible mast comprises a mast storing unit 30 which is configured to store an extendible mast 20 including plural stages of foldable trusses in a state that the stages are folded. The pushing-out apparatus 10 for an extendible mast also comprises a mast pushing-out unit 40 which is configured to be stored in the mast storing unit 30 around the extendible mast 20 stored in the mast storing unit 30 in the state the plural stages are folded. The pushing-out apparatus 10 for an extendible mast further comprises a mast pushing-out driving unit 50. The mast pushing-out driving unit 50 is configured to move the mast pushing-out unit 40 to a predetermined projecting position in an outside of the mast storing unit 30 while the plural stages of the extendible mast 20 are folded, to sequentially extend out the plural folded stages of the extendible mast 20 stored in the mast storing unit 30 by the mast pushing-out unit 40 of the projecting position from the mast storing unit 30 and to push out the extended stages from the mast pushing-out unit 40 of the projecting position in a side of the mast pushing-out unit 40 opposing to the mast storing unit 30. In FIG. 1, a direction in which the mast pushing-out unit 40 is moved toward the projecting position is indicated by an arrow A.

[Mast Storing Unit]

In FIG. 2A, the mast storing unit 30 of the pushing-out apparatus 10 for an extendible mast shown in FIG. 1 is schematically shown, and the mast storing unit 30 is provided with one part of the mast pushing-out driving unit 50.

The mast storing unit 30 includes plural supporting columns (stringers) 32 which extend in the moving direction "A" of the mast pushing-out unit 40 and which are arranged to separate from each other at plural apex parts of a polygonal plane crossing the moving direction "A".

The mast storing unit 30 further includes a tip end side connecting frame 34 and a rear end side connecting frame 36. The tip end side connecting frame 34 connects tip ends of the plural supporting columns (stringers) 32 located in a tip end side in the moving direction "A" with each other. And, the rear end side connecting frame 36 connects rear ends of the plural supporting columns (stringers) 32 located in a rear end side in the moving direction "A" with each other.

The tip end side connecting frame 34 is configured by a frame of a polygonal shape, in this embodiment a shape of equilateral triangle, with cut apexes, and the frame is arranged to cross the moving direction "A" of the mast pushing-out unit 40 at right angles. The rear end side connecting frame 36 is configured by a plate member of a polygonal shape, in this embodiment a shape of equilateral triangle, with cut apexes, and the frame is arranged to cross the moving direction "A" of the mast pushing-out unit 40 at right angles. Therefore, the number of the supporting columns (stringers) 32 of the mast storing unit 30 is three. And, plural lightning-openings are formed in a center part of the plate member.

One part of the mast pushing-out driving unit 50 includes at least two driving shafts 52 which project from the rear end side connecting frame 36 to the tip end side connecting frame 34. In this embodiment, the driving shafts 52 extend along the supporting columns (stringers) 32 toward the tip end side connecting frame 34 in inner sides of the supporting columns (stringers) 32 of the plural apex parts, in this embodiment three apex parts, of the rear end side connecting frame 36. However, in FIG. 2A, only one driving shaft 52 can be seen. At least two, in this embodiment three, driving shafts 52 are arranged at apex parts of a polygonal shape, in this embodiment a shape of equilateral triangle, which is smaller than the polygonal shape, in this embodiment the shape of equilateral triangle, of the tip end side connecting frame 34. Base end portions of the at least two, in this embodiment three, driving shafts 52 are rotationally supported by the rear end side connecting frame 36.

The one part of the mast pushing-out driving unit 50 further includes a bi-directional rotation driving source 54 provided in the mast storing unit 30. In this embodiment, the bi-directional rotation driving source 54 is a bi-directional electric motor supported by the rear end side connecting frame 36.

Between an output shaft of the bi-directional rotation driving source 54 and each of the base end portions of the at least two, in this embodiment three, driving shafts 52, a power transmission mechanism (not shown) is provided. The power transmission mechanism surely transmits a rotational driving force of the output shaft to each of the base end portions of the at least two, in this embodiment three, driving shafts 52. This power transmission mechanism is configured to transmit a rotation of the output shaft to the at least two, in this embodiment three, driving shafts 52 and to rotate the at least two, in this embodiment three, driving shafts 52 in the same direction, in the same rotational force and in the same rotational speed to each other. That is, when the output shaft rotates in one direction, the at least two, in this embodiment three, driving shafts 52 rotate in the same one direction, in the same rotational force and in the same rotational speed to each other. When the output shaft rotates in the other direction, the at least two, in this embodiment three, driving shafts 52 rotate in the same other direction, in the same rotational force and in the same rotational speed to each other.

In this embodiment, the output shaft of the bi-directional rotation driving source 54 projects into a back side of the rear end side connecting frame 36, and the base end portion of each of the at least two, in this embodiment three, driving shafts 52 also projects into the back side of the rear end side connecting frame 36. And, the not shown power transmission mechanism is a gear train arranged on the back side of the rear end side connecting frame 36.

A first latch mechanism RM1 is provided on a side surface of a tip end portion of each supporting column (stringer) 32. And, the first latch mechanism RM1 is configured to fix the mast pushing-out unit 40 after the mast pushing-out unit 40 moves from the mast storing unit 30 and reaches at the projecting position in the outer space of the mast storing unit 30. The first latch mechanism RM1 for the mast pushing-out unit 40 functions as a selectively fixing unit for selectively fixing the mast pushing-out unit 40 at the projecting position. A change-over switch SW is provided on the side surface of the tip end portion of one supporting column (stringer) 32, and the change-over switch SW is configured to change the rotational direction of the output shaft of the bi-directional rotation driving source 54.

Between the tip end side connecting frame 34 and the rear end side connecting frame 36, paired first movement guide columns 38 for the mast pushing-out unit 40 are provided at both sides of each supporting column (stringer) 32. The paired first movement guide columns 38 are configured to guide a movement of the mast pushing-out unit 40 in the direction "A". Each first movement guide column 38 extends in the same direction as the extending direction of the supporting column (stringer) 32 to be in parallel to the supporting column (stringer) 32, and both ends of the first movement guide column 38 are fixed to the tip end side connecting frame 34 and the rear end side connecting frame 36. Guide rollers GR are provided on an inner side of a tip end portion of each first movement guide column 38, and the guide rollers GR are configured to surely, precisely and smoothly guide the movement of the mast pushing-out unit 40 in the direction "A". In FIG. 2A, only the guide rollers GR of two first movement guide columns 38 can be seen.

Second movement guide columns 39 for the extendible mast 20 are fixed on a front surface of the rear end side connecting frame 36 to be arranged at an inner side of a peripheral edge of the rear end side connecting frame 36 and between the plural supporting columns (stringers) 32. The second movement guide columns 39 are configured to guide a movement of the extendible mast 20 in the direction "A" while the extendible mast 20 is stored in the mast storing unit 30 in a state that the plural stages of the extendible mast 20 are folded. The second movement guide columns 39 extend in the same direction as the extending direction of the supporting columns (stringers) 32 to be in parallel to the supporting columns (stringers) 32. Mast stoppers ST for the extendible mast 20 are fixed to tip ends of the second movement guide columns 39. The mast stoppers ST are made of elastic material and configured to prevent the extendible mast 20 from moving in the direction "A" while the extendible mast 20 is stored in the mast storing unit 30 in the state that the plural stages of the extendible mast 20 are folded.

[Mast Pushing-Out Unit]

In FIG. 3A, the mast pushing-out unit 40 of the pushing-out apparatus 10 for an extendible mast shown in FIG. 1 is schematically shown, and the mast pushing-out unit 40 is provided with the other part of the mast pushing-out driving unit 50.

The mast pushing-out unit 40 includes at least two lead screws 42 included in the other part of the mast pushing-out driving unit 50. Each of the at least two lead screws 42 has a rotational center line which extends in the moving direction "A" of the mast pushing-out unit 40 relative to the mast storing unit 30 and is provided to the mast pushing-out unit 40 to be rotational on the rotational center line. In this embodiment, the lead screws 42 are arranged at plural apex parts of a polygonal shape which crosses the moving direction "A" of the mast pushing-out unit 40 to be separated from each other.

The mast pushing-out unit 40 further includes a tip end side connecting frame 44 and a rear end side connecting frame 46. The tip end side connecting frame 44 connects tip ends of the at least two plural lead screws 42, in this embodiment three, located in a tip end side in the moving direction "A" with each other. And, the rear end side connecting frame 46 connects rear ends of the at least two lead screws 42, in this embodiment three, located in a rear end side in the moving direction "A" with each other.

A plain dimension of each of the tip end side connecting frame 44 and rear end side connecting frame 46 is smaller than a plain dimension of the tip end side connecting frame 34 which is the frame of the polygonal shape, in this embodiment equilateral triangle, of the mast storing unit 30 with its apexes cut. Therefore, each of the tip end side connecting frame 44 and rear end side connecting frame 46 can pass through a central opening of the polygonal shape, in this embodiment equilateral triangle, with its apexes cut in the tip end side connecting frame 34 of the mast storing unit 30.

The tip end side connecting frame 44 is configured by a frame of a polygonal shape, in this embodiment a shape of equilateral triangle, with cut apexes, and the frame is arranged to cross the moving direction "A" of the mast pushing-out unit 40 at right angles. The rear end side connecting frame 46 is configured by a frame of a polygonal shape, in this embodiment a shape of equilateral triangle, with cut apexes, and the frame is arranged to cross the movement direction "A" of the mast pushing-out unit 40 at right angles. Therefore, the number of the lead screws 42 of the mast pushing-out unit 40 is three.

The at least two, in this embodiment three, lead screws 42 are included in the other part of the mast pushing-out driving unit 50. A tip end portion of each of the at least two, in this embodiment three, lead screws 42 is supported by the tip end side connecting frame 44 to be rotational. And, a rear end portion of each of the at least two, in this embodiment three, lead screws 42 is supported by the rear end side connecting frame 46 to be rotational.

As shown in FIG. 3B, a driving shaft receiving hole 42a is formed in each of the at least two, in this embodiment three, lead screws 42 to extend along the rotational center line of each lead screw 42 from a rear end of each lead screw 42 toward a tip end of each lead screw 42. Each driving shaft receiving hole 42a is configured to allow a longitudinal movement of each lead screw 42 on the rotational center line relative to each of the at least two, in this embodiment three, driving shaft 52 (see FIG. 2A) which are rotationally supported by the mast storing unit 30 and which configure the one part of the mast pushing-out driving unit 50. Further, each driving shaft receiving hole 42a and each driving shaft 52 are also configured to transmit a rotation of each driving shaft 52 to each lead screw 42.

Figure 2B:
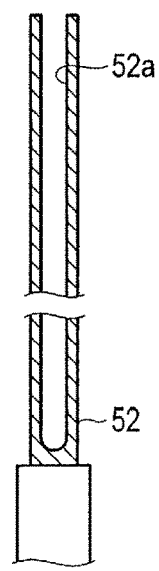
FIG. 2B is a schematic longitudinal sectional view of a driving shaft included in the one part of the mast pushing-out driving unit of FIG. 2A.

In this embodiment, such a configuration of each driving shaft 52 as described above is provided by for example a slit 52a which is formed in each outer peripheral surface of the at least two, in this embodiment three, driving shafts 52. The slit 52a extends in the outer peripheral surface of each driving shaft 52 from a tip end of each driving shaft 52 to a base end portion thereof and penetrates in each driving shaft 52 in a radial direction of each driving shaft 52 through its rotational center line, as shown in FIG. 2B. Further in this embodiment, such a configuration of each driving shaft receiving hole 42a as described above is provided by a radially projecting member 42b which is provided on an inner peripheral surface of each driving shaft receiving hole 42a of each lead screw 42 as shown in FIG. 3B. And, the radially projecting member 42b is able to be inserted in the slit 52a of each driving shaft 52. The radially projecting member 42b of the inner peripheral surface of the driving shaft receiving hole 42a of each lead screw 42 is able to slide in a direction along the rotational center line in the slit 52a of each driving shaft 52 and to engage with each driving shaft 52 in a peripheral direction thereof.

In this embodiment, paired third movement guide columns (rails) 48 are arranged between the tip end side connecting frame 44 and the rear end side connecting frame 46 at both sides of each lead screw 42. And, the third movement guide columns (rails) 48 are configured to guide the movement of the mast pushing-out unit 40 in the direction "A" from the mast storing unit 30. Each third movement guide column (rail) 48 extends in the same direction as an extending direction of each lead screw 42 to be in parallel to each lead screw 42, and both ends of each third movement guide column (rail) 48 are fixed to the tip end side connecting frame 44 and the rear end side connecting frame 46. The paired third movement guide columns (rails) 48 at both sides of each lead screw 42 are received in the paired first movement guide columns 38 at both sides of each supporting columns (stringers) 32 of the mast storing unit 30. And, movements of the paired third movement guide columns (rails) 48 are guided by the paired guide rollers GR of the paired first movement guide columns 38 so that the movement of the mast pushing-out unit 40 in the direction "A" from the mast storing unit 30 is guided.

That is, in the mast pushing-out unit 40, the tip end side and rear end side connecting frames 44 and 46 cross the moving direction "A" in the mast pushing-out unit 40. And, the plural, in this embodiment three pairs, third movement guide columns (rails) 48 are arranged at plural apex parts of the polygonal shape, in this embodiment the equilateral triangle, of each of the tip end side connecting frame 44 and the rear end side connecting frame 46 to separate from each other. Each tip end and each rear end of the third movement guide columns (rails) 48 are respectively connected to the tip end side connecting frame 44 and the rear end side connecting frame 46. Such third movement guide columns (rails) 48 as described above constitute supporting columns for the tip end side connecting frame 44 and the rear end side connecting frame 46.

A second latch mechanism RM2 is provided on a side surface of a tip end portion of each third movement guide column (rail) 48. The second latch mechanism RM2 functions as a selectively fixing unit which selectively fix a base end portion of the extendible mast 20 after all of the plural stages are extended out.

[Extendible Mast]

Figure 7:
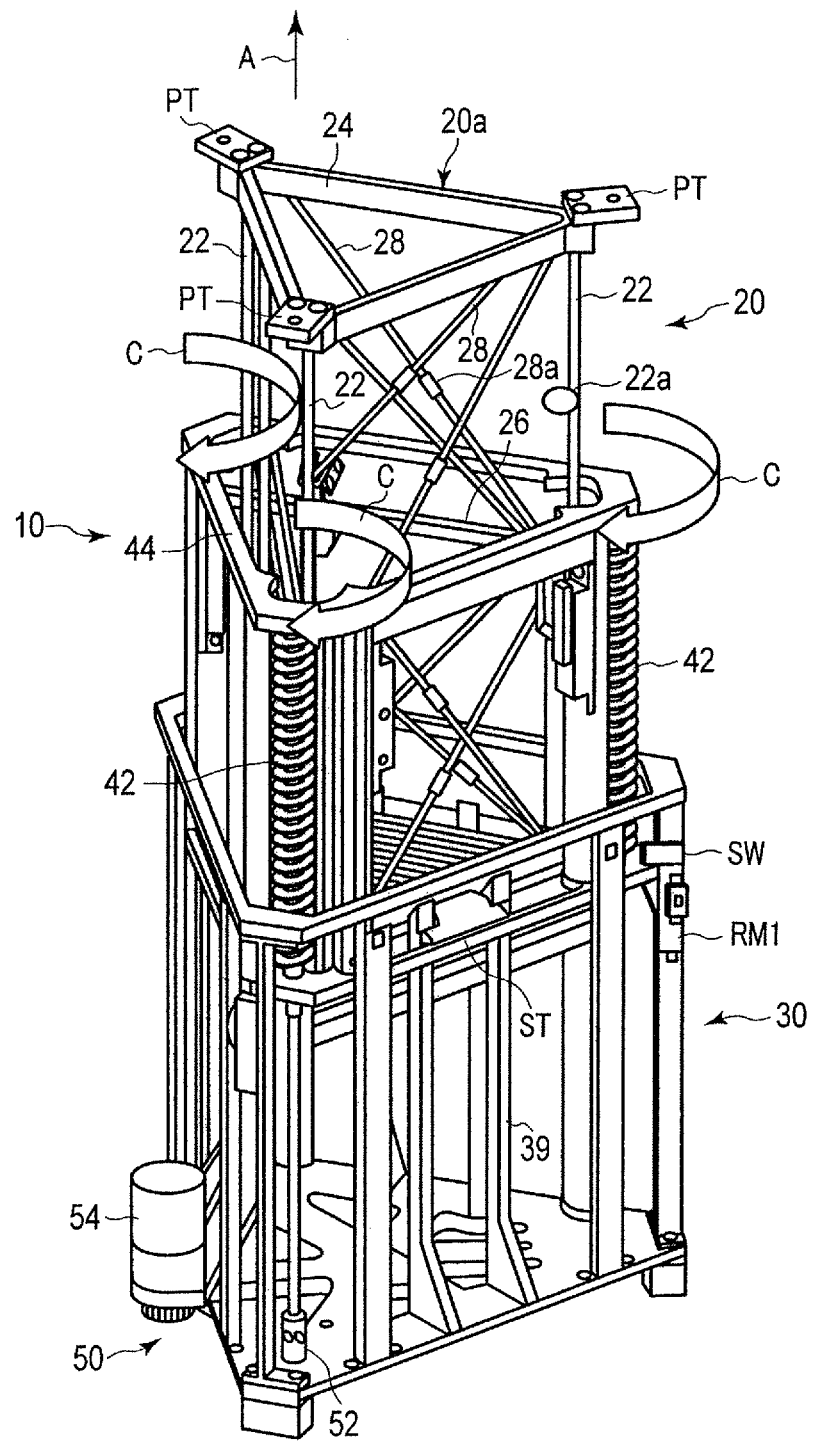
FIG. 7 is a perspective view schematically showing a state that, in the pushing-out apparatus for an extendible mast shown in FIG. 1, the tip end stage of the extended out truss of the extendible mast is pushed out by the mast pushing-out driving unit of FIGS. 2A and 3A from the mast pushing-out unit of FIG. 3A, the mast pushing-out unit being already arrived at the projecting position shown in FIG. 6, and a second stage in the stages of the plural trusses of the extendible mast being extended out from the mast storing unit by the mast pushing-out unit.

In FIG. 4, the extendible mast 20 which is in a state that the plural trusses of stages are folded is schematically shown. In FIG. 7, an extended tip end stage 20a of the extendible mast 20 is shown.

As shown in FIG. 7, an extended tip end stage 20a of the extendible mast 20 includes plural stage supporting columns 22 which extend in the moving direction "A" of the mast pushing-out unit 40. The stage supporting columns 22 are arranged at a plurality of apex parts of a polygonal shape so as to separate from each other, a plane of the polygonal shape crossing the moving direction "A". Each of the plural stage supporting columns 22 comprises a foldable/straight-line maintaining mechanism 22a at an intermediate position of the stage supporting column 22 in a longitudinal direction thereof. The foldable/straight-line maintaining mechanism 22a makes each stage supporting column 22 being foldable into an inner side of the polygonal shape and always urges each stage supporting column 22 into a straight-line when a folding angle of the stage supporting column 22 becomes lager than a predetermined angle. After each stage supporting column 22 extends in a straight line, the foldable/straight-line maintaining mechanism 22a prevents each stage supporting column 22 from folding into the inner side and maintains each stage supporting column 22 in the straight line until a predetermined force toward the inner side is applied to the foldable/straight-line maintaining mechanism 22a. Such a foldable/straight-line maintaining mechanism 22a can be for example a toggle mechanism assembled with an elastic member.

The tip end stage 20a further includes a tip end side connecting frame 24 and a rear end side connecting frame 26. The tip end side connecting frame 24 connects tip ends of the stage supporting columns 22 with each other, the tip ends being located in a tip end side of the moving direction "A" of the mast pushing-out unit 40. The rear end side connecting frame 26 connects rear ends of the stage supporting columns 22 with each other, the rear ends being located in a rear end side of the moving direction "A" of the mast pushing-out unit 40.

A plain dimension of each of the tip end side connecting frame 24 and the rear end side connecting frame 26 is smaller than a plain dimension of a central opening of the tip end side connecting frame 44 of the mast pushing-out unit 40. Therefore, each of the tip end side connecting frame 24 and the rear end side connecting frame 26 can be passed through the central opening of the tip end side connecting frame 44 of the mast pushing-out unit 40.

The tip end side connecting frame 24 is configured by a frame of a polygonal shape, in this embodiment a shape of equilateral triangle, with cut apexes, and the frame is arranged to cross the moving direction "A" of the mast pushing-out unit 40 at right angles. The rear end side connecting frame 26 is configured by a frame of a polygonal shape, in this embodiment a shape of equilateral triangle, with cut apexes, and the frame is arranged to cross the movement direction "A" of the mast pushing-out unit 40 at right angles. Therefore, the number of the stage supporting columns 22 of the extended tip end stage 20*a* of the extendible mast 20 of this embodiment 20 is three.

More specifically, the plain dimension of the polygonal shape, in this embodiment the shape of equilateral triangle, of each of the tip end side connecting frame 24 and the rear end side connecting frame 26 is smaller than the plain dimension of the polygonal shape, in this embodiment the shape of equilateral triangle, with cut apexes of the central opening of each of the tip end side connecting frame 44 and rear end side connecting frame 46 of the mast pushing-out unit 40. Therefore, each of the tip end side connecting frame 24 and the rear end side connecting frame 26 can pass through the central opening of the polygonal shape, in this embodiment equilateral triangle, with cut apexes of each of the tip end side connecting frame 44 and rear end side connecting frame 46 of the mast pushing-out unit 40.

A pair of diagonal braces 28 which diagonally cross with each other is arranged between the tip end side connecting frame 24 and the rear end side connecting frame 26 and between the adjacent two stage supporting columns 22. A tip end portion of one of the diagonal braces 28 is rotationally connected to the tip end side connecting frame 24 near to the tip end of one of the adjacent two stage supporting columns 22. And, a rear end portion of the one diagonal brace 28 is rotationally connected to the rear end side connecting frame 26 near to the rear end of the other of the adjacent two stage supporting columns 22. A tip end portion of the other of the diagonal braces 28 is rotationally connected to the tip end side connecting frame 24 near to the tip end of the other of the adjacent two stage supporting columns 22. And, a rear end portion of the other diagonal brace 28 is rotationally connected to the rear end side connecting frame 26 near to the rear end of the one of the adjacent two stage supporting columns 22.

Each of the paired diagonal braces 28 includes a pair of half brace members divided at an intermediate portion of each diagonal brace 28 and a longitudinally movable connecting mechanism 28*a* provided at the intermediate portion of each diagonal brace 28. The longitudinally movable connecting mechanism 28*a* connects the paired half brace members with each other at the intermediate portion of each diagonal brace 28 to make the paired half brace members being longitudinally movable in a plain including the paired diagonal braces 28. And, the longitudinally movable connecting mechanism 28*a* is configured to prevent the paired half brace members from moving in a direction in which the paired half brace members are moved away from each other in their longitudinal directions after each of the two stage supporting columns 22 at the both sides of the paired diagonal braces 28 extends in the straight line as described above.

Configurations of the plural stages of the extendible mast 20 have the same dimension as to each other. However, the rear end side connecting frame 26 of one of two adjacent stages nearer to the tip end of the extendible mast 20 functions as the tip end side connecting frame 24 of the other of the two adjacent stages nearer to the rear end of the extendible mast 20.

When each of the plural stages of the extendible mast 20 is extended out, a distance between the tip end side connecting frame 24 and the rear end side connecting frame 26 is substantially the same as a distance between the tip end side connecting frame 44 and the rear end side connecting frame 46 of the mast pushing-out unit 40.

In this embodiment, a stopper PT is fixed to each of plural apexes of the tip end side connecting frame 24 of the tip end stage 20*a* of the extendible mast 20. The stopper PT projects outward from each of the plural apexes in a plain including the tip end side connecting frame 24 and is configured to prevent the extendible mast 20 from being drawn into the mast pushing-out unit 40.

As shown in FIG. 4, engaging members EM are fixed to each of sides of the rear end side connecting frame 26 of a rear end stage of the extendible mast 20 in this embodiment. The engaging members EM are configured to engage with the second latch mechanisms RM2 on the tip end portions of three paired third movement guide columns (rails) 48 of the mast pushing-out unit 40. And, the tip end portions of three paired third movement guide columns (rails) 48 are near to the sides of the tip end side connecting frame 44 of the mast pushing-out unit 40.

A guide roller AR is attached to each of the apexes of the rear end side connecting frame 26 of the tip end stage 20*a* of the extendible mast 20 and to each of the apexes of each of the tip and rear end side connecting frames of each of the stages from the second stage downward. The guide roller AR can be engaged with screw grooves on an outer periphery of the lead screw 42 of the mast pushing-out unit 40 corresponding thereto.

[An Action of the Pushing-Out Apparatus for an Extendible Mast]

In the followings, an action of the pushing-out apparatus 10 for an extendible mast shown in FIG. 1 will be explained.

In FIG. 1, the extendible mast 20 which is in the state that the stages of the plural trusses are folded as shown in FIG. 4 is stored in the mast storing unit 30. Further, the mast pushing-out unit 40 is stored around the extendible mast 20 which is in the state that the stages of the plural trusses are folded as shown in FIG. 4 in the mast storing unit 30.

That is, FIG. 1 shows an initial state of the pushing-out apparatus 10 for an extendible mast. In this state, the mast pushing-out unit 40 well shown in FIG. 3A is stored in an inner space of the mast storing unit 30. And, the inner space is defined in the mast storing unit 30 by surrounding with the tip end side connecting frame 34, the rear end side connecting frame 36, three supporting columns (stringers) 32 and three pairs of first movement guide columns 38 in an outside of three second movement guide columns 39.

In this state, three driving shafts 52 of the mast storing unit 30 are inserted in the driving shaft receiving holes 42*a* opened in the rear ends of three lead screws 42 of the mast pushing-out unit 40. And, the radially projecting member 42*b* of the driving shaft receiving hole 42*a* of each of three lead screws 42 is inserted in the slit 52*a* of each of three driving shaft 52.

Three paired third movement guide columns (rails) 48 of the mast pushing-out unit 40 are arranged along the inner side surfaces of three paired first movement guide columns 38 of the mast storing unit 30, and are supported by the guide rollers GR on the inner sides of the tip end portions of three paired first movement guide columns 38.

The first latch mechanism RM1 (the selectively fixing unit for the mast pushing-out unit 40) at the side surface of the tip end portion of each of three supporting columns (stringers) 32 inwardly projects its latch. The change-over switch SW at the side surface of the tip end portion of one supporting column (stringer) 32 is located in a one directional rotating position which can rotate the output shaft of the bi-directional rotation driving source 54 of the mast pushing-out driving unit 50 in one direction.

The second latch mechanism RM2 at the side surface of the tip end portion of each of three paired third movement guide columns (rails) 48 of the mast pushing-out unit 40 inwardly projects its latch.

The tip end side connecting frame 44 of the mast pushing-out unit 40 is substantially co-planar with the tip end side connecting frame 34 of the mast storing unit 30. The rear end side connecting frame 46 of the mast pushing-out unit 40 separates from the rear end side connecting frame 36 of the mast storing unit 30 in the moving direction "A".

In FIG. 1, the extendible mast 20 in which the stages of the plural trusses are folded as shown in FIG. 4 makes the stoppers PT at three apexes of the tip end side connecting frame 24 of the folded tip end stage 20*a* abut three apexes of the tip end surface of the tip end side connecting frame 44 of the mast pushing-out unit 40.

The guide rollers AR at three apexes of the rear end side connecting frame 26 of the folded tip end stage 20*a* and at three apexes of each of the tip end side and rear end side connecting frames of the folded stages following the folded tip end stage 20*a* are entered into the screw grooves of three lead screws 42 of the mast pushing-out unit 40.

Three sides of each of the rear end side connecting frame 26 of the folded tip end stage 20*a* and the tip end side and rear end side connecting frames of the folded stages following the folded tip end stage 20*a* are arranged along the inner side surfaces of three second movement guide columns 39 of the mast storing unit 30.

The tip ends of the three sides of the rear end side connecting frame 26 of the folded tip end stage 20*a* engage with the rear end surfaces of the stoppers ST of three second movement guide columns 39 of the mast storing unit 30.

Figure 5:
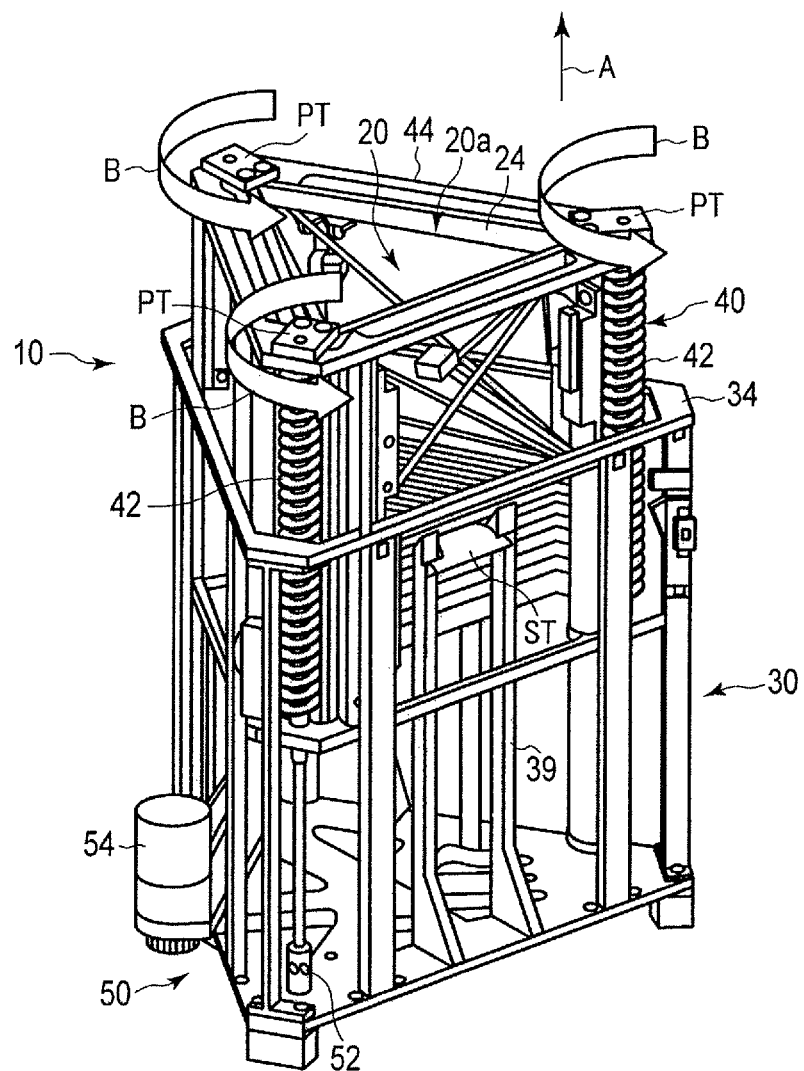
FIG. 5 is a perspective view schematically showing a state that, in the pushing-out apparatus for an extendible mast shown in FIG. 1, the mast pushing-out unit of FIG. 3A, together with a tip end stage 20a in the stages of the plural trusses of the extendible mast, is moving from the mast storing unit of FIG. 2A by the mast pushing-out driving unit of FIGS. 2A and 3A toward a projecting position in an outer space of the mast storing unit.

In the pushing-out apparatus 10 for an extendible mast in the initial state shown in FIG. 1, in order to move the mast pushing-out unit 40 from the mast storing unit 30 to the predetermined projecting position in the outer space, to orderly extend out the folded stages of the extendible mast 20 in the mast storing unit 30 by the mast pushing-out unit 40 of the projecting position and then to push out the extended stages from the mast pushing-out unit 40 of the projecting position to a side of the mast pushing-out unit 40 of the projecting position, the side being opposite to the mast storing unit 30, at first the output shaft of the bi-directional rotation driving source 54 of the mast pushing-out driving unit 50 is rotated in one direction. This rotation makes the three driving shafts 52 of the mast storing unit 30 rotate in one direction "B" as shown in FIG. 5. And, the three driving shafts 52 make the three lead screws 42 of the mast pushing-out unit 40 rotate at the same time in the same direction as shown by arrows "B" and at the same rotational speed as to each other.

Then, three lead screws 42 of the mast pushing-out unit 40 move in the direction "A" as shown in FIG. 5 relative to the guide rollers AR of the rear end side connecting frame 26 of the tip end stage 20*a* and the tip and rear end side connecting frames of each of the stages from the second stage downward while the tip ends of three sides of the tip end stage 20*a* are engaged with the rear end surfaces of the stoppers ST of three second movement guide columns 39 in the mast storing unit 30. By this movement, the mast pushing-out unit 40 moves from the inner space of the mast storing unit 30 to the predetermined projecting position in the outer space of the mast storing unit 30 through the central opening of the tip end side connecting frame 34 of the mast storing unit 30.

During this movement, the tip end side connecting frame 24 of the tip end stage 20*a* of the extendible mast 20, together with the tip end side connecting frame 44 of the mast pushing-out unit 40, moves in the direction "A" as shown in FIG. 5 while the stoppers PT at three apexes of the tip end side connecting frame 24 abut against the three apexes of the tip end surface of the tip end side connecting frame 44. And, since the tip ends of three sides of the rear end side connecting frame 26 of the tip end stage 20*a* of the extendible mast 20 engage with the rear end surfaces of the stoppers ST of three second movement guide columns 39 of the mast storing unit 30, the rear end side connecting frame 26 of the tip end stage 20*a*, together with the folded and remaining stages continued to the tip end stage 20*a*, stay in the inner space of the mast storing unit 30.

As a result of this, each of three stage supporting columns 22 folded in two at the foldable/straight-line maintaining mechanism 22*a* in the truss of the tip end stage 20*a* transforms in a straight line. At the same time, the above described and paired half diagonal brace members of each of three paired diagonal braces 28 which are approached to one another in their longitudinal direction through the longitudinally movable connecting mechanism 28*a* are moved away from each other in the longitudinal direction.

Figure 6:
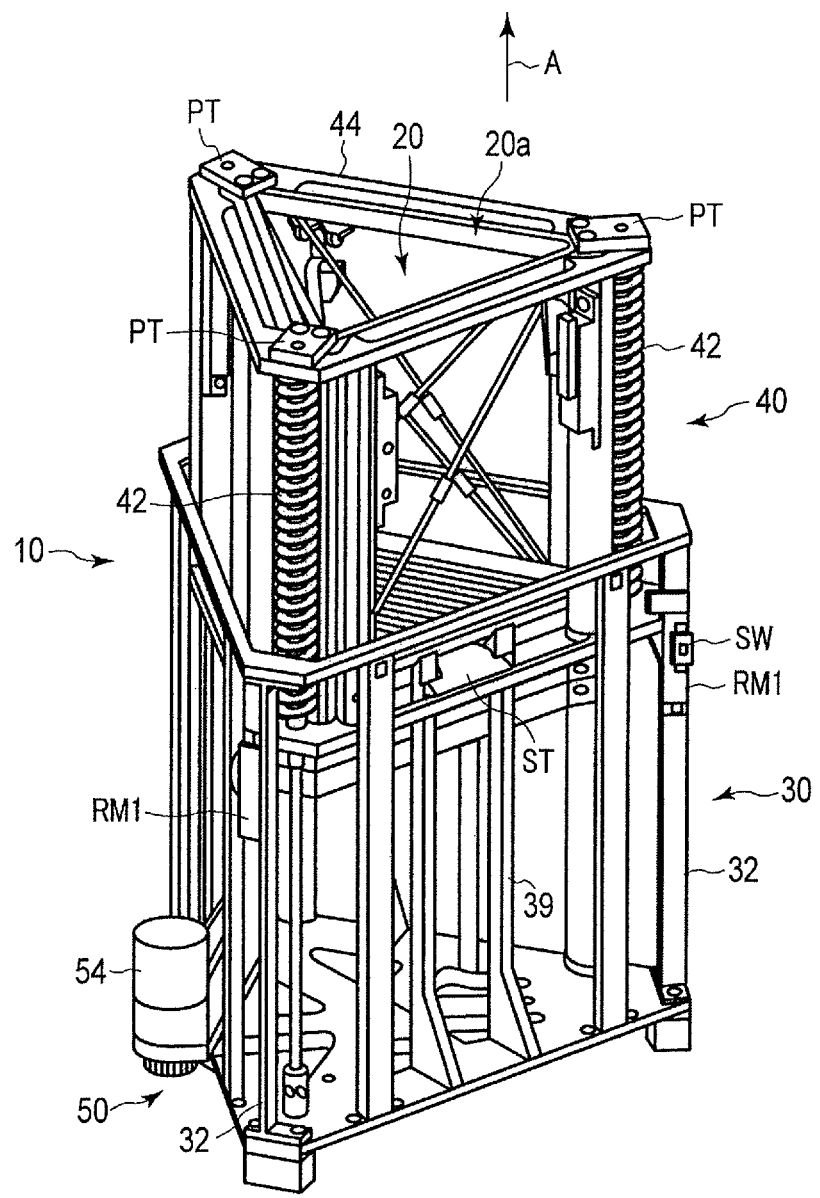
FIG. 6 is a perspective view schematically showing a state that, in the pushing-out apparatus for an extendible mast shown in FIG. 1, the mast pushing-out unit of FIG. 3A is moved from the mast storing unit of FIG. 2A by the mast pushing-out driving unit of FIGS. 2A and 3A and is arrived at the projecting position in the outer space of the mast storing unit, and only the tip end stage in the stages of the plural trusses of the extendible mast is extended out from the mast storing unit.

In FIG. 6, the mast pushing-out unit 40 reached at the predetermined projecting position after moving toward the predetermined projecting position in the outer space from the inner space of the mast storing unit 30 is shown.

In this state, three lead screws 42 of the mast pushing-out unit 40 engage with the guide rollers AR of at least the rear end side connecting frame 26 of the tip end stage 20*a*. Three sides of the rear end side connecting frame 46 of the mast pushing-out unit 40 which is just before reaching at the projecting position make the latches of the first latch mechanisms (selectively fixing units) RM1 being retracted into the outside of the mast storing unit 30. At the same time as the mast pushing-out unit 40 reaches at the projecting position, the latch of the first latch mechanism (selectively fixing unit) RM1 at the side surface of the tip end portion of each of three supporting columns (stringers) 32 of the mast storing unit 30 inwardly projects in the mast storing unit 30. The inwardly projected latches engage with three sides of the rear end side connecting frame 46 of the mast pushing-out unit 40 of the projecting position so that the mast pushing-out unit 40 is fixed at the projecting position.

When the mast pushing-out unit 40 reaches at the projecting position as shown in FIG. 6, the tip end stage 20*a* of the extendible mast 20 is extended out in an inner space of the mast pushing-out unit 40, the inner space being surrounded by the tip end side connecting frame 44, rear end side connecting frame 46, three lead screws 42 and three paired third movement guide columns (rails) 48 of the mast pushing-out unit 40, while the stoppers PT at three apexes of the tip end side connecting frame 24 abut against three apexes of the tip end surface of the tip end side connecting frame 44. That is, each of three stage supporting columns 22 is held in a straight line through the foldable/straight-line maintaining mechanism 22*a* in the truss of the tip end stage 20*a*. And, the paired half diagonal brace members of each of three paired diagonal braces 28 are held in positions which are farthest away from each other in the longitudinal direction through the longitudinally movable connecting mechanism 28*a*.

In this time, the tip ends of three sides of the rear end side connecting frame 26 of the tip end stage 20*a* which has been extended out as described above still engage with the rear end surfaces of the stoppers ST of three second movement guide columns 39 of the mast storing unit 30.

When the mast pushing-out unit 40 reaches at the projecting position, the change-over switch SW at the side surface of the tip end portion of one of three supporting columns (stringers) 32 of the mast storing unit 30 is changed from the above described one directional rotation position to an another directional rotation position. In the one directional rotation position, the change-over switch SW can rotate the output shaft of the bi-directional rotation driving source 54 of the mast pushing-out driving unit 50 in one direction. And, in the other directional rotation position, the change-over switch SW can rotate the output shaft of the bi-directional rotation driving source 54 of the mast pushing-out driving unit 50 in the other direction.

As a result of this, the output shaft of the bi-directional rotation driving source 54 of the mast pushing-out driving unit 50 starts to rotate in the other direction, and this rotation rotates each of three driving shafts 52 of the mast storing unit 30 in the other direction as indicated by an arrow "C" in FIG. 7. With such rotations of three driving shafts 52, three lead screws 42 of the mast pushing-out unit 40 are simultaneously rotated in the same other direction as shown by the arrow "C" in FIG. 7 at the same rotational speed as to each other.

Then, since the guide rollers AR of three apexes of the rear end side connecting frame 26 of the tip end stage 20a are entered into and engaged with the screw grooves of three lead screws 42 of the mast pushing-out unit 40, the rear end side connecting frame 26 of the tip end stage 20a is moved in the direction "A" from the inner space of the mast storing unit 30 into the above described inner space of the mast pushing-out unit 40 of the projecting position.

With this movement, the tip end surfaces of three sides of the rear end side connecting frame 26 of the tip end stage 20a push outward the rear end surfaces of the stoppers ST of three second movement guide columns 39 to cross the direction "A" at right angles against elastic forces of the stoppers ST. And, the rear end side connecting frame 26 of the tip end stage 20a get over the stoppers ST.

As described above, the rear end side connecting frame 26 of the tip end stage 20a works as the tip end side connecting frame of the stage which is next to the tip end stage 20a and which is called as a second stage in the followings. Therefore, then tip end surfaces of three sides of a rear end side connecting frame of the second stage become to engage with the rear end surfaces of the stoppers ST. As a result of this, the rear end side connecting frame of the second stage, together with the folded remaining stages, is still stored in the inner space of the mast storing unit 30.

The rear end side connecting frame 26 of the tip end stage 20a (the tip end side connecting frame of the second stage as described above) which get over the stoppers ST while the tip end surfaces of three sides of the rear end side connecting frame of the second frame engage with the rear end surfaces of the stoppers ST of three second movement guide columns 39 of the mast storing unit 30, is moved out from the inner space of the mast storing unit 30 into the inner space of the mast pushing-out unit 40 in the direction "A" by the three lead screws 42 each rotating in the other direction as described above. With this movement, as shown in FIG. 7, the truss of the second stage is extended out like as the truss of the tip end stage 20a in the inner space of the mast pushing-out unit 40. The foldable/straight-line maintaining mechanisms 22a of the second stage maintain the truss of the second stage like as the truss of the tip end stage in the extended out state in the inner space of the mast pushing-out unit 40.

While the truss of the second stage is extended out in the inner space of the mast pushing-out unit 40, the tip end stage 20a which has been extended out is pushed out from the inner space of the mast pushing-out unit 40 of the projecting position through the central opening of the tip end side connecting frame 44 of the mast pushing-out unit 40 into the outer space of the mast pushing-out unit 40 in the side which is opposite to the mast storing unit 30.

Each of three lead screws 42 of the mast pushing-out unit 40 continues to rotate in the direction "C" as shown in FIG. 7 after the tip end stage 20a has been extended out in the inner space of the mast pushing-out unit 40 of the projecting position. As a result of this, the plural stages following the tip end stage 20a are extended out in the inner space of the mast pushing-out unit 40 respectively as described above. The extended-out stages are respectively pushed out from the inner space of the mast pushing-out unit 40 of the projecting position through the central opening of the tip end side connecting frame 44 of the mast pushing-out unit 40 into the outer space of the mast pushing-out unit 40 in the side which is opposite to the mast storing unit 30.

After the rear end stage of the extendible mast 20 is extended out in the inner space of the mast pushing-out unit 40 of the projecting position and just before the extended-out rear end stage is pushed out from the inner space of the mast pushing-out unit 40 of the projecting position through the central opening of the tip end side connecting frame 44 of the mast pushing-out unit 40 into the outer space of the mast pushing-out unit 40 in the side which is opposite to the mast storing unit 30, the engaging members EM (see FIG. 4) on three sides of the rear end side connecting frame of the rear end stage push outward the latches of the second latch mechanisms RM2 provided on the side surfaces of the tip end portions of three paired third movement guide columns (rails) 48 of the mast pushing-out unit 40. Then, the latches of the second latch mechanisms RM2 return to project inward. The inwardly projected latches engage with the engaging members EM (see FIG. 4) on three sides of the rear end side connecting frame of the rear end stage, and fix the rear end stage at the tip end portions of three paired third movement guide columns (rails) 48 of the mast pushing-out unit 40.

As a result of this, the rear end side connecting frame of the rear end stage (that is, the extendible mast 20 the all stages of which has been extended out and pushed out from the inner space of the mast pushing-out unit 40 of the projecting position into the outer space in the side of the mast pushing-out unit 40 which is opposite to the mast storing unit 30) is prevented from dropping out from the inner space of the mast pushing-out unit 40 of the projecting position.

Figure 8:
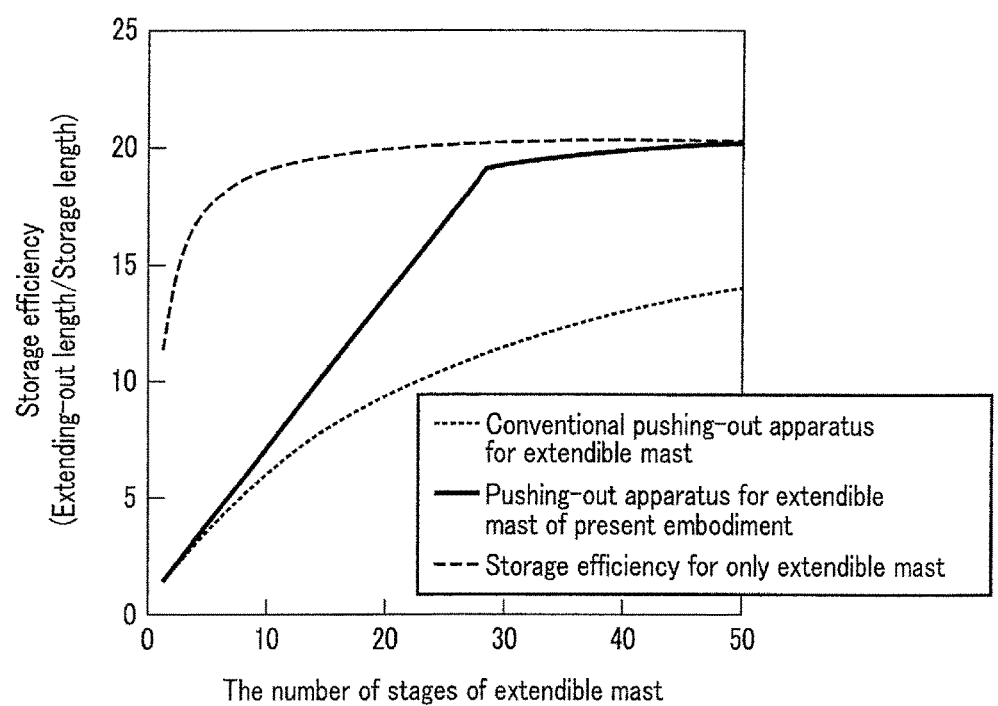
FIG. 8 shows a storage efficiency of the pushing-out apparatus for an extendible mast according to one embodiment of the present invention and a storage efficiency of a conventional pushing-out apparatus for an extendible mast, these storage efficiencies relating to predetermined numbers of stages of the extendible mast.

In FIG. 8, a difference between a storage efficiency of the pushing-out apparatus 10 for an extendible mast according to one embodiment of the present invention and a storage efficiency of a conventional pushing-out apparatus for an extendible mast, provided that these pushing-out apparatus use extendible masts of the same numbers of stages as to one another and based on an analysis of inventors of this invention, is shown. In the conventional pushing-out apparatus, a mast storing unit and a mast pushing-out unit are fixed to each other in a state that these units are located adjacent to each other. In the pushing-out apparatus 10 according to one embodiment of the present invention, as described above with reference to FIGS. 1 to 7, the mast pushing-out unit 40 is stored in the inner space of the mast storing unit 30 in the initial state. And, the mast pushing-out unit 40 can be moved out from the inner space of the mast storing unit 30 to the projecting position in the outer space of the mast storing unit 30.

With this analysis, it is found that the storage efficiency of the pushing-out apparatus 10 for an extendible mast according to one embodiment of the present invention is about 1.7 times of the storage efficiency of the conventional pushing-out apparatus in maximum.

If the pushing-out apparatus 10 according to one embodiment of the present invention and described above with reference to FIGS. 1 to 7 has a configuration which can retract the latch of the second latch mechanism RM2 on the side surface of the tip end portion of each of three paired third movement guide columns (rails) 48 of the mast pushing-out unit 40 of the projecting position from its inward fixing position to its outward releasing position while all of the stages of the extendible mast 20 are extended out and pushed out from the inner space of the mast pushing-out unit 40 of the projecting position to the outer space, the rear end stage of the extendible mast 20 can be drawn into the inner space of the mast pushing-out unit 40 as explained as follows.

That is, by making the latches to release the engagement with the engaging members EM on three sides of the rear end side connecting frame of the rear end stage of the extendible mast 20, the fixation of the rear end stage to the tip end portions of the third movement guide columns (rails) 48 of the mast pushing-out unit 40 is released. Then, by rotating three lead screws 42 in one direction which is opposed to the rotating direction "C" in FIG. 7, the rear end stage can be retracted into the inner space of the mast pushing-out unit 40.

After this, if the pushing-out apparatus 10 further has a configuration which can fold each of three stage supporting columns 22 of each of the plural stages of the extendible mast 20 into two against the straight line maintaining function of the foldable/straight-line maintaining mechanism 22a, the plural stages excluding the tip end stage 20a can be sequentially folded and stored in the inner space of the mast storing unit 30. At this time, the tip end stage 20a is stored in the inner space of the mast pushing-out unit 40 in a state that the tip end stage 20a is extended out as shown in FIG. 6.

Further after this, if the first latch mechanism RM1 (the selectively fixing unit) on the side surface of the tip end portion of each of three supporting columns (stringers) 32 of the mast storing unit 30 has a configuration which can retract the latch from its inward position at which the latch projects into the inner space of the mast storing unit 30 to its outward position at which the latch is retracted from the inner space of the mast storing unit 30, the mast pushing-out unit 40 can be retracted into the inner space of the mast storing unit 30.

That is, by making the latches to release the engagement with three sides of the rear end side connecting frame 46 of the mast pushing-out unit 40 of the projecting position, the fixation of the mast pushing-out unit 40 to the projecting position is released. Then, by rotating the three lead screws 42 in the other direction which is opposed to the rotating direction "B" in FIG. 5, the mast pushing-out unit 40 can be retracted into the inner space of the mast storing unit 30. During this, if the pushing-out apparatus 10 further has a configuration which can fold each of three stage supporting columns 22 of the tip end stage 20a of the extendible mast 20 into two against the straight line maintaining function of the foldable/straight-line maintaining mechanism 22a, the truss of the tip end stage 20a of the extendible mast 20 can be folded in the inner space of the mast pushing-out unit 40.

And finally, the pushing-out apparatus 10 for an extendible mast according to the one embodiment can be returned to its initial state in which the mast pushing-out unit 40 storing the extendible mast 20 with folded stages in its inner space is stored in the inner space of the mast storing unit 30 as shown in FIG. 1.

While one embodiment has been described, the embodiment has been presented by way of example only, and is not intended to limit the scope of the invention. Indeed, the novel embodiments described herein may be embodied in a variety of other forms; furthermore, variously omissions, substitutions and changes in the form of the embodiment described herein may be made without departing from the spirit of the invention. The accompanying claims and their equivalents are to cover such forms or modifications as would fall within the scope and sprit of the invention.

What is claimed is:

1. A pushing-out apparatus for an extendible mast, comprising:
    a mast storing unit which is configured to store an extendible mast including plural stages of foldable trusses in a state that the plural stages are folded;
    a mast pushing-out unit which is configured to be stored in the mast storing unit around the extendible mast stored in the mast storing unit in the state the plural stages are folded; and
    a mast pushing-out driving unit which is configured to move the mast pushing-out unit in a moving direction to a predetermined projecting position in an outside of the mast storing unit when the plural stages of the extendible mast are folded, to sequentially extend out the plural folded stages of the extendible mast stored in the mast storing unit by the mast pushing-out unit of the projecting position from the mast storing unit and to push out the extended stages from the mast pushing-out unit of the projecting position in a side of the mast pushing-out unit opposing the mast storing unit, wherein
    the mast pushing-out driving unit includes
        lead screws each of which has a rotational center line extending in the moving direction of the mast pushing-out unit, which are provided in the mast pushing-out unit to be rotational on the rotational center line, and which are able to engage with the plural stages of the extendible mast stored in the mast storing unit;
        a bi-directional rotation driving source which is provided in one of the mast storing unit and the mast pushing-out unit and which selectively rotates the lead screws in one or another direction,
    wherein the bi-directional rotation driving source is configured to rotate the lead screws in one direction for moving the mast pushing-out unit, by the lead screws, from the mast storing unit to the projecting position, together with a stage included in the plural folded stages of the extendible mast in the mast storing unit and located in a tip end of the moving direction, and for extending out the tip end stage in the mast pushing-out unit, and
    to rotate the lead screws in the other direction for sequentially pushing out and extending out the plural stages, by the lead screws, after reaching the mast pushing-out unit at the projecting position, following the tip end stage included in the plural folded stages of the extendible mast in the mast storing unit, and for sequentially pushing out the extended stages following the tip end extended stage from the mast pushing-out unit to an outside of the mast pushing-out unit; and a selectively fixing unit which selectively fixes the mast pushing-out unit arrived at the projecting position to the projecting position.

2. The pushing-out apparatus for an extendible mast according to claim 1, wherein:

the mast storing unit includes plural supporting columns which extend in the moving direction of the mast pushing-out unit and which are arranged to separate from each other at plural apex parts of a polygonal plane crossing the moving direction;

a tip end side connecting frame which connects tip ends of the plural supporting columns located in a tip end side in the moving direction with each other; and a rear end side connecting frame which connects rear ends of the plural supporting columns located in a rear end side in the moving direction with each other, and the mast pushing-out unit includes plural supporting columns which extend in the moving direction and which are arranged to separate from each other at plural apex parts of a polygonal plane crossing the moving direction;

a tip end side connecting frame which connects tip ends of the plural supporting columns located in a tip end side in the moving direction with each other; and a rear end side connecting frame which connects rear ends of the plural supporting columns located in a rear end side in the moving direction with each other, wherein the mast pushing-out driving unit includes at least two of the lead screws, and both ends of each of the at least two of the lead screws are rotationally supported by the tip end side connecting frame and rear end side connecting frame of the mast pushing-out unit.

3. The pushing-out apparatus for an extendible mast according to claim 2, wherein:

the mast pushing-out driving unit includes at least two driving shafts each of which has a rotational center line extending in the moving direction of the mast pushing-out unit, each of which is provided in the mast storing unit to be rotational on the rotational center line, and each of which is rotated by a rotation of the bi-directional rotation driving source, each of the at least two lead screws includes a driving shaft receiving hole which extends along a rotational center line of each of the at least two lead screws and which receives each of the at least two driving shaft, and each of the driving shaft receiving hole and the driving shaft corresponding to the driving shaft receiving hole has a configuration to allow a movement of the driving shaft relative to the corresponding driving shaft receiving hole along the rotational center line and to allow an engagement of the driving shaft with the corresponding driving shaft receiving hole in a circumferential direction of the driving shaft.

4. The pushing-out apparatus for an extendible mast according to claim 1, wherein the bi-directional rotation driving source includes a bi-directional electric motor provided in the mast storing unit.

5. The pushing-out apparatus for an extendible mast according to claim 2, wherein the bi-directional rotation driving source includes a bi-directional electric motor provided in the mast storing unit.

6. The pushing-out apparatus for an extendible mast according to claim 3, wherein the bi-directional rotation driving source includes a bi-directional electric motor provided in the mast storing unit.

* * * * *